US007948429B2

(12) United States Patent
Drake et al.

(10) Patent No.: US 7,948,429 B2
(45) Date of Patent: May 24, 2011

(54) METHODS AND APPARATUS FOR DETECTION/CLASSIFICATION OF RADAR TARGETS INCLUDING BIRDS AND OTHER HAZARDS

(75) Inventors: Peter R. Drake, Northborough, MA (US); Yuchoi F. Lok, Framingham, MA (US)

(73) Assignee: Raytheon Company, Waltham, MA (US)

( * ) Notice: Subject to any disclaimer, the term of this patent is extended or adjusted under 35 U.S.C. 154(b) by 199 days.

(21) Appl. No.: 12/435,508

(22) Filed: May 5, 2009

(65) Prior Publication Data

US 2010/0079328 A1    Apr. 1, 2010

Related U.S. Application Data

(60) Provisional application No. 61/050,402, filed on May 5, 2008.

(51) Int. Cl.
*G01S 13/00* (2006.01)

(52) U.S. Cl. .................. 342/26 R; 342/26 A; 342/26 B; 342/26 C; 342/26 D; 342/188

(58) Field of Classification Search ................ 342/26 R, 342/26 A, 26 B, 26 C, 26 D, 123, 139, 140, 342/147, 148, 159, 188
See application file for complete search history.

(56) References Cited

U.S. PATENT DOCUMENTS

| | | | | |
|---|---|---|---|---|
| 3,448,450 A | * | 6/1969 | Alfandari et al. | 342/157 |
| 3,885,237 A | * | 5/1975 | Kirkpatrick | 342/26 B |
| 4,649,388 A | * | 3/1987 | Atlas | 342/26 D |
| 4,649,389 A | * | 3/1987 | Taylor et al. | 342/123 |
| RE33,152 E | * | 1/1990 | Atlas | 342/26 R |
| 4,961,075 A | * | 10/1990 | Ward | 342/140 |
| 5,093,662 A | * | 3/1992 | Weber | 342/26 D |
| 5,130,712 A | * | 7/1992 | Rubin et al. | 342/26 D |
| 5,175,551 A | * | 12/1992 | Rubin | 342/26 D |
| 5,402,129 A | * | 3/1995 | Gellner et al. | 342/70 |
| 5,583,972 A | * | 12/1996 | Miller | 345/419 |
| 5,982,329 A | * | 11/1999 | Pittman et al. | 343/700 MS |
| RE36,819 E | * | 8/2000 | Gellner et al. | 342/70 |
| 6,097,329 A | * | 8/2000 | Wakayama | 342/26 D |
| 6,215,438 B1 | * | 4/2001 | Oswald et al. | 342/70 |

(Continued)

FOREIGN PATENT DOCUMENTS

EP    1345044 A1    9/2003

(Continued)

OTHER PUBLICATIONS

Notification of Transmittal of the International Search Report and the Written Opinion of the International Searching Authority, or the Declaration, PCT/US2009/042789 dated Aug. 25, 2009.

(Continued)

*Primary Examiner* — Thomas H Tarcza
*Assistant Examiner* — Peter Bythrow
(74) *Attorney, Agent, or Firm* — Daly, Crowley, Mofford & Durkee, LLP (57) ABSTRACT

Methods and apparatus for processing data from a low beam channel, a high beam channel and a weather channel to perform an altitude estimation based upon a target amplitude ratio between the low beam channel and the high beam channel and target range, and for performing target detection based upon data from the weather channel. In one embodiment, migrating birds can be more accurately detected and classified than with conventional systems.

19 Claims, 9 Drawing Sheets

U.S. PATENT DOCUMENTS

| | | | |
|---|---|---|---|
| 6,456,227 B2 * | 9/2002 | Wada et al. | 342/26 R |
| 6,653,971 B1 * | 11/2003 | Guice et al. | 342/54 |
| 7,006,038 B2 * | 2/2006 | Smith | 342/360 |
| 7,242,343 B1 * | 7/2007 | Woodell | 342/26 B |
| 7,427,943 B1 * | 9/2008 | Kronfeld et al. | 342/26 B |
| 7,864,103 B2 * | 1/2011 | Weber et al. | 342/123 |
| 2001/0033246 A1 * | 10/2001 | Burchett et al. | 342/91 |
| 2004/0119633 A1 * | 6/2004 | Oswald et al. | 342/70 |
| 2008/0266171 A1 * | 10/2008 | Weber et al. | 342/123 |

FOREIGN PATENT DOCUMENTS

| | | |
|---|---|---|
| GB | 1100119 | 1/1968 |
| GB | 0701869.0 | 1/2007 |
| GB | 0710209.8 | 5/2007 |
| GB | 2439204 A | 12/2007 |
| GB | 0801850.9 | 2/2008 |
| GB | 2447560 A | 9/2008 |
| GB | 2448488 A | 10/2008 |
| GB | 2439205 B | 4/2009 |
| GB | 2441053 B | 4/2009 |
| GB | 2453121 A | 4/2009 |
| GB | 2447560 A | 7/2009 |
| GB | 2447560 B | 10/2009 |
| GB | 2461848 A | 1/2010 |
| GB | 2461849 A | 1/2010 |
| GB | 2461850 A | 1/2010 |
| GB | 2461851 A | 1/2010 |
| WO | WO 9800729 | 1/1998 |
| WO | WO 0003264 A1 | 1/2000 |
| WO | WO 0159473 A2 | 8/2001 |
| WO | WO 0159473 A3 | 8/2001 |
| WO | WO 2008001092 A2 | 1/2008 |
| WO | WO 2008001092 A3 | 1/2008 |
| WO | WO 2008093036 A2 | 8/2008 |
| WO | WO 2008093036 A3 | 8/2008 |
| WO | WO 2008093092 A2 | 8/2008 |
| WO | WO 2008093092 A3 | 8/2008 |
| WO | WO 2008/145993 | 12/2008 |
| WO | WO 2008145993 A2 | 12/2008 |
| WO | WO 2010028831 A1 | 3/2010 |

OTHER PUBLICATIONS

Written Opinion of the International Searching Authority, PCT/US2009/042789 dated Aug. 25, 2009.

Notification of Transmittal of the International Search Report and the Written Opinion of the International Searching Authority, or the Declaration, PCT/US2010/031372 dated Jul. 19, 2010, 6 pages.

Written Opinion of the International Searching Authority, PCT/US2010/031372 dated Jul. 19, 2010, 11 pages.

Jackson, C.A.; Butler, M.M.: "Options for mitigation of the effects of windfarms on radar systems", Radar Systems, 2007 IET International Conference OON, Oct. 18, 2007, XP007913802, ISSN: 0537-9989, ISBN: 978-0-86341-848-8, 6 pages.

Bannister, David J.: "Radar in-fill for Greater Wash area—Feasibility study final report", Aug. 31, 2007, XP007913816, Retrieved from the Internet: URL:http://www.bwea.com/pdf/AWG_Reference/0709%20BERR%20COWRIE%20Radar%20in-fill%20for%20Greater%20Wash%20area%20-%20Feasibility%20study%20final%20report.pdf, 41 pages.

Raytheon Canada Ltd.: "Report on advanced mitigating techniques to remove the effects of wind turbines and wind farms on the Raytheon ASR-10/23SS Radars", Jul. 17, 2006, XP007913794, Retrieved from the Internet: URL:http://www.decc.gov.uk/assets/decc/what%20we%20do%20uk%20energy%20supply/energy%20mix/renewable%20energy/planning/on_off_wind/aero_military/file37012.pdf_and_file37014.pdf, 98 pages.

Auld: "Options for mitigating the impact of wind turbines on NERL's primary radar infrastructure" 2006, XP007913817, Retrieved from the internet: URL:http://www.bwea.com/pdf/AWG_Reference/0701%20BERR%20Options%20for%20mitigating%20the%20impacts%20of%20wind%20turbines%20on%20NERL%27s%20primary%20radar%20infrastructure.pdf, 11 pages.

Perry, J. et al.: "Wind Farm Clutter Mitigation in Air Surveillance Radar", Radar Conference, 2007 IEEE, IEEE, PI LNKD- DOI:10.1109/RADAR.2007.374197, Apr. 1, 2007, XP031180885, ISBN: 978-1-4244-0283-0, 6 pages.

File downloaded for U.S. Appl. No. 12/761,590, filed Apr. 16, 2010 Jul. 15, 2010, 1409 pages.

Notification Concerning Transmittal of the International Preliminary Report on Patentability (Chapter 1 of the Patent Cooperation Treaty), PCT/US2009/042789, date of mailing Nov. 18, 2010, 2 pages.

Written Opinion of the International Searching Authority, PCT/US2009/042789, date of mailing Nov. 18, 2010, 7 pages.

Craig Webster, "Wind farms vs. radar—seeing through the clutter", Cambridge Consultants, Innovation Day 2008, Oct. 22, 2008, 29 pages.

* cited by examiner

METHODS AND APPARATUS FOR DETECTION/CLASSIFICATION OF RADAR TARGETS INCLUDING BIRDS AND OTHER HAZARDS

CROSS REFERENCE TO RELATED APPLICATIONS

The present application claims the benefit of U.S. Provisional Patent Application No. 61/050,402, filed on May 5, 2008, which is incorporated herein by reference.

STATEMENT REGARDING FEDERALLY SPONSORED RESEARCH

This invention was made with Government support under Contract No. F19628-96-D-0038 awarded by the Department of the Air Force. The Government has certain rights in this invention.

BACKGROUND

As is known in the art, airborne clutter, such as birds, can be dangerous to aviators. Birds can severely damage aircraft and aircrafts engines. Particularly during times of migration, birds can significantly degrade air travel safety and efficient air traffic control.

Birds are often seen as false alarms on radar systems and can easily be confused with weather. There have been prior attempts to detect and classify birds based on reflectivity (radar cross section), Doppler velocity, and Doppler spectrum. These approaches are not believed to have been successful.

In addition, the increased use of wind farms all over the world has created radar system interference. Similar to group traffic, the rotating blades of the wind farm create false alarms on the radar display. Air traffic over such areas often mix with the false alarms and cause confusion. Mitigation methods are usually ineffective and either cause dropped tracks or create false tracks in such areas.

There are a variety of known detection and classification of birds using radar systems. Most such systems use higher frequency bands and higher angular and range resolution than for typical radar applications, such as weather and air traffic control. Such systems are expensive and are not readily integrated with air traffic control systems.

In other known attempts to overcome the above-mentioned problems, auxiliary equipment, such as infra-red cameras and W-band radar, has been used. However, such equipment is not readily integrated with air traffic management systems.

SUMMARY OF THE INVENTION

The present invention provides methods and apparatus for classifying targets, such as birds and aircraft, from altitude estimation and polarimetric data including differential phase and differential reflectivity data. In exemplary embodiments, weather and target channel data having different polarizations are used to obtain the polarimetric data. With this arrangement, aircraft hazards, such as migrating birds can be avoided. While exemplary embodiments are shown having various channel configurations and polarizations, it is understood that modifications can be made to meet the needs of a particular application without departing from the scope of the present invention.

In one aspect of the invention, a system comprises an antenna, a target channel including: a low beam receiver channel, a high beam receiver channel, and a weather receiver channel, and a signal processor to receive data from the low beam channel, the high beam channel and the weather channel for performing an altitude estimation based upon a target amplitude ratio between the low beam channel and the high beam channel and target range, and for performing target classification by calculating polarimetric parameters from the target data and the weather data including differential reflectivity and differential phase data, wherein the target channel has a different polarization than the weather channel.

The system can further including one or more of the following features: the altitude estimation is obtained over multiple scans, the differential reflectivity and the differential phase are obtained from co-polarization data and reverse polarization data, the signal processor generates probability values for a target, the probability values correspond to at least birds and aircraft, the differential reflectivity is defined as:

$$Z_{DR} = 10 \cdot \log_{10}\left(\frac{I_c^2 + Q_c^2}{I_r^2 + Q_r^2}\right),$$

and the differential phase is defined as:

$$\phi_{DR} = \tan^{-1}\left(\frac{I_c}{Q_c}\right) - \tan^{-1}\left(\frac{I_r}{Q_r}\right),$$

where R is range, $I_c$ and $Q_c$ are the in-phase and quadrature data of the co-polarization channel, and $I_r$ and $Q_r$ are the in-phase and quadrature data of the reverse polarization channel, and the weather channel data and the target channel data are processed in the same radar dwell for simultaneous polarimetric data.

In another aspect of the invention, a method comprises receiving radar return at a target channel and a weather channel, wherein the target channel includes a low beam receiver channel and a high beam receiver channel, transforming the radar return in a signal processor and memory including processing data from the low beam channel, the high beam channel and the weather channel to generate altitude estimation data based upon a target amplitude ratio between the low beam channel and the high beam channel and target range, and transforming the radar return comprising performing target classification by calculating polarimetric parameters from the target data and the weather data including differential reflectivity and differential phase data, wherein the target channel has a different polarization than the weather channel.

In another aspect of the invention, an article comprises a computer readable medium comprising stored instructions that enable a machine to perform the steps of: receiving radar return at a target channel and a weather channel, wherein the target channel includes a low beam receiver channel and a high beam receiver channel, transforming the radar return in a signal processor and memory including processing data from the low beam channel, the high beam channel and the weather channel to generate altitude estimation data based upon a target amplitude ratio between the low beam channel and the high beam channel and target range, and transforming the radar return comprising performing target classification by calculating polarimetric parameters from the target data and the weather data including differential reflectivity and differential phase data, wherein the target channel has a different polarization than the weather channel.

BRIEF DESCRIPTION OF THE DRAWINGS

The foregoing features of this invention, as well as the invention itself, may be more fully understood from the following description of the drawings in which.

DETAILED DESCRIPTION

In general, method and apparatus for air clutter detection exploit weather and high/low beam target channels of a terminal S-band ASR air traffic control radar, e.g., 2700 MHZ to 2900 MHz, to create polarimetric data and altitude estimation. By also utilizing Doppler information, the system can classify detections as fixed-wing aircraft, rotary-wing aircraft, birds, insects, rain, hail, false alarms due to ground traffic, wind farm induced clutter, anomalous propagation induced clutter, and the like. In other embodiments, air clutter detection is provided as part of an en-route L-band system.

The inventive system determines polarimetic signatures to distinguish between aircraft and birds, for example. The system has a target channel and a weather channel. The weather channel is a different polarization from that of the target channel, and the channels are processed in separate receiver-signal processor channels. The weather channel provides precipitation reflectivity. Using a system processor, the weather channel data is processed in a similar manner to the target channel data. The amplitude ratio and phase difference between the target and weather channel data can be calculated with the resultant amplitude-phase factors providing distinguishing target characteristics. Since the system includes high and low beams, the system can be used as in a monopulse radar to estimate target altitude by simultaneously processing the high and low beam data.

Figure 1:
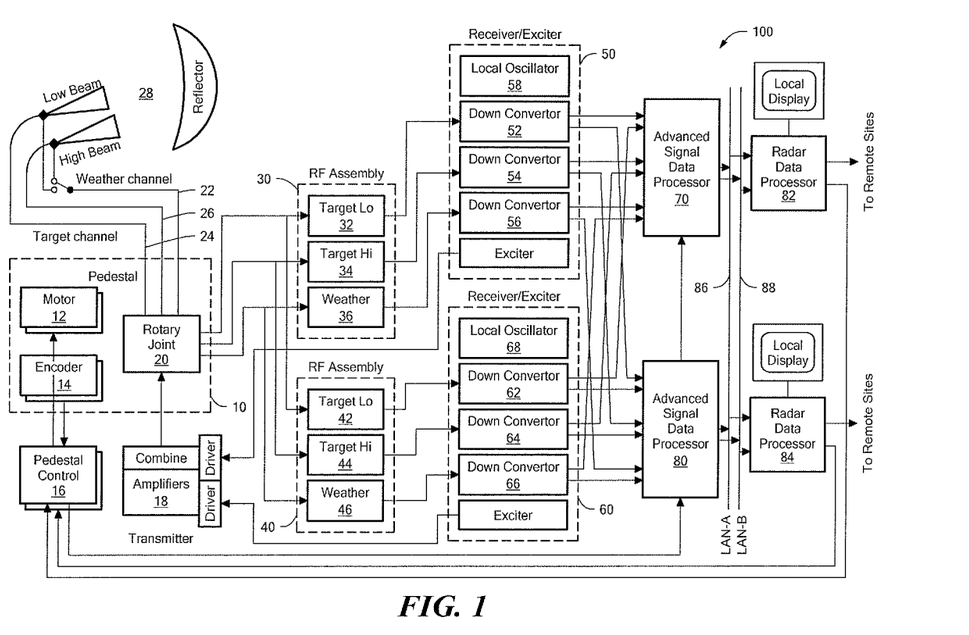
FIG. 1 is a schematic representation of a system providing target classification in accordance with exemplary embodiments of the invention.

FIG. 1 shows an exemplary system 100 for air clutter detection in accordance with exemplary embodiments of the invention. A pedestal 10 includes a motor 12 and encoder 14 coupled to a pedestal controller 16. A transmitter 18 is coupled to a rotary joint 20 providing a weather channel 22 and low beam and high beam target channels 24, 26 to an antenna assembly 28.

The rotary joint 20 is coupled to a first RF assembly 30 and a second RF assembly 40, each having a target low beam module 32, 42, a target high beam module 34, 44, and a weather module 36, 46. A first receiver/exciter 50 and a second receiver/exciter 60 each include down converter modules 52, 54, 56, 62, 64, 66 and local oscillators 58, 68 for the respective low beam, high beam, and weather signals. The downconverted signals are provided to first and second signal processors 70, 80, which are both coupled to first and second radar data processors 82, 84 via first and second local area networks (LANs) 86, 88, for example.

The system 100 can include features of air traffic control systems that have an independent weather channel and target channel. Weather related false alarms in the target channel are typically not suppressed by checking against the detection of precipitation in the weather channel. Such weather channel reports are also not processed in such a manner as to be able to discern whether the precipitation type is rain, hail or snow.

The inventive system 100 uses data from both the weather high and low beam channels and target high and low beam channels to detect and classify detections. The system takes advantage of the different polarization between the weather and the target channels to provide polarimetric data. In addition, the low and high beam of the target channels provide altitude information. Together with the Doppler and reflectivity information, the system 100 is thus capable of classifying detections and becomes an integrated detection classification system for air traffic control use.

In operation, the signal processor uses the high beam data in the short pulse range, e.g., in the order of 0.5 to 6.5 nmi to avoid the ground clutter, and switches at a predefined range, e.g., 6.5 nmi, to the low beam for complete altitude coverage.

In an exemplary embodiment, the system 100 includes a multi-channel, e.g., seven, rotary joint 20 to enable both the high beam data and the low beam data to be processed concurrently over the full instrument range. For each detection in the low beam data, the system searches for a corresponding detection in the high beam data at the same range. The altitude of the detection is estimated using a lookup table with the target amplitude ratio between the two beams as one of the indexes and the range as the other. An exemplary altitude estimation technique is shown and described by H. R. Ward in U.S. Pat. No. 4,961,075, which is incorporated herein by reference. The estimated altitude of the detection is useful for separating aircraft from false alarms due to moving clutter, such as birds, weather, etc., ground traffic and wind farms.

The system 100 also performs target detection using the weather channel data. Since the weather channel data is of a different polarization to the target channel, the differential reflectivity, differential phase and correlation coefficient between the two polarization data can be calculated. According to D. S. Zrnic, birds and insects have differential reflectivity between 2 and 9 dB and differential phase about 25 degrees; ground clutter has large differential reflectivity but has a zero mean value; weather has low differential reflectivity and phase but has high correlation coefficient. Discrimination between birds and insects is possible because insects tend to have higher differential reflectivity, while birds have higher differential phase.

Figure 2:
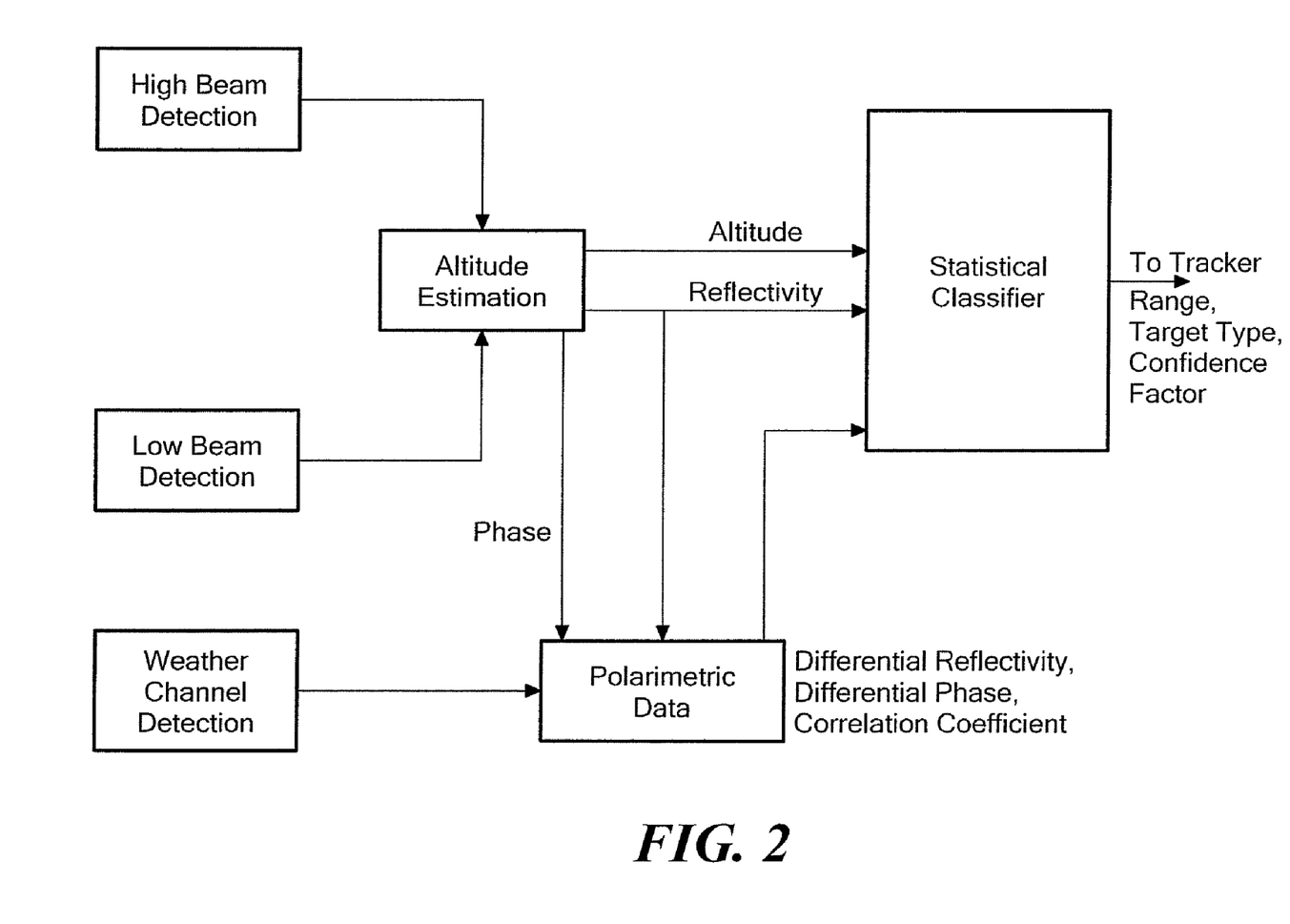
FIG. 2 is a block diagram showing additional detail for the system of FIG. 1.

FIG. 2 shows an exemplary system 200 having target classification in accordance with exemplary embodiments of the invention. The system 200 includes a high beam channel 202 and a low beam channel 204 providing data to an altitude estimation module 206. The altitude estimation module 206 outputs altitude 208 and reflectivity 210 information to statistical classifier module 212.

The altitude estimation module 206 provides phase information 214 to a polarimetric data module 216, and also receives data from a weather channel detection module 218 and the reflectivity information 220 from the altitude estimation module 206. The polarimetric data module 216 provides differential reflectivity information, differential phase information, and correlation coefficient information to the statistical classifier module 212.

In general, the polarimetric characteristics are used as detection features. Together with the estimated altitude these features are mapped to the statistics of the known detection classes, which include aircraft types, weather types, birds, insects and false alarm types. These statistics form a multi-dimensional "training database." During normal operation, the measured features are mapped to the training database to read out the detection classes. The highest class with the highest population is selected as the result and the population count is converted to a confidence factor. The confidence factors over multiple radar scans are accumulated for the detections and the conferred results are reported to the air traffic control display. The implementation of such statistical classifier could be similar to the one used in reference.

Figure 3:
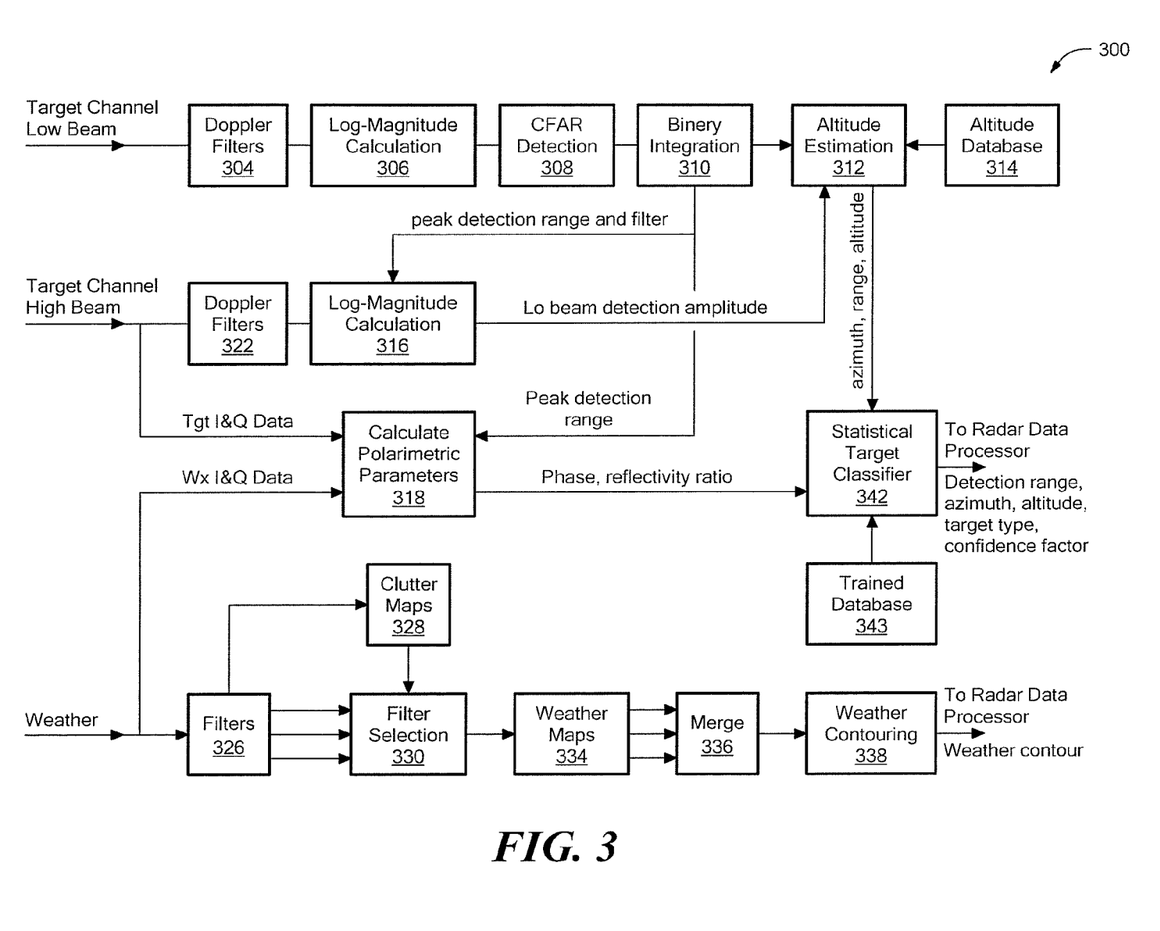
FIG. 3 is a block diagram showing additional detail for the system of FIG. 2.

FIG. 3 shows further details 300 of the system 200 of FIG. 2. For the low beam target channel, data is processed by a series of modules including a Doppler filter module 304, and log-magnitude calculation module 306. A CFAR (Constant False Alarm Rate) detection module 308 is coupled to a binary integration module 310, which provides an output to an altitude estimation module 312. The altitude estimation module 312 and altitude database 314 are described more fully below.

Binary integration data (peak detection range and filter) is provided to a log-magnitude calculation module 316 for the high beam target channel and to a module to calculate polarimetric parameters 318. The high beam target channel path includes a Doppler filter module 322, which is coupled to the log magnitude calculation module 316.

The low beam weather channel data is processed by a pulse compression module 324 and a filter module 326. A clutter map module 328, a filter selection module 330, and a clear day coefficient selection module 332 are coupled in parallel and exchange information with the filter module 326. A weather map module 334 receives the filtered data and provides a series of outputs to a merge module 336, which provides output data to a weather contour module 338 coupled to a radar data processor.

The module 318 to calculate polarimetric parameters receives target I and Q data from the high beam target pulse compression module 320 and weather I and Q data from the weather channel pulse compression module 324 and generates phase and reflectivity ratio information, as described more fully below. This information is provided to a statistical target classifier module 342, which receives data from a trained database 343, outputting detection range, azimuth, altitude, target type, and confidence information provided to an RDP.

Figure 4A:
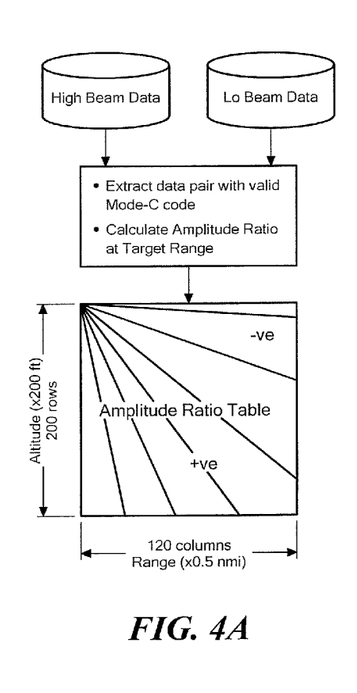
FIG. 4 is a graphical representation of the method for generating the amplitude ratio versus altitude lookup table.
Figure 4B:
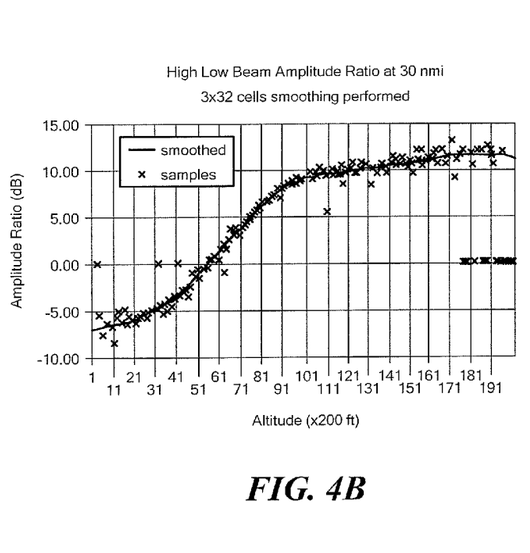

As shown in FIGS. 4A and 4B, the high beam data and low beam data pair are extracted along with the Mode-C code. An amplitude ratio for the high and low beam data is calculated for a target range to generate an amplitude ratio table at the altitude given by the Mode-C code, as shown. In one embodiment, a 3×32 cells operator (32 range columns and 3 altitude rows) is used to average the amplitude ratio. The table is then smoothed before being used for altitude estimation. FIG. 4B shows the smoothed amplitude ratio versus altitude curve for the range of 30 nmi.

Figure 5:
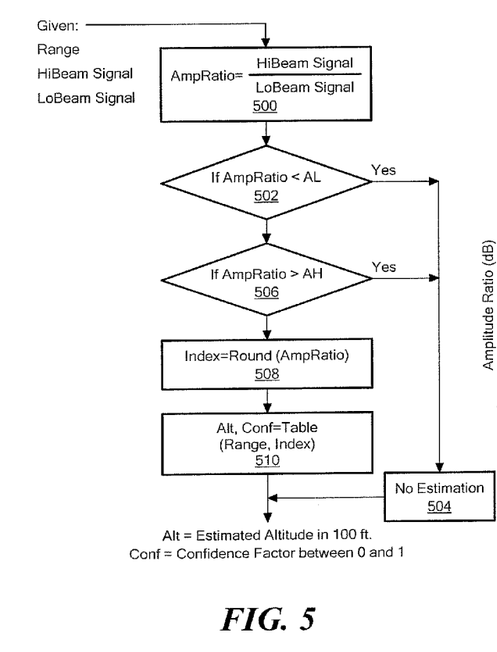
FIG. 5 is a flow diagram showing exemplary altitude estimating processing

FIG. 5 shows an exemplary sequence of steps for estimating altitude in accordance with exemplary embodiments of the invention. In step 500, the amplitude ratio is determined for a given range from the high beam signal over the low beam signal. In step 502, it is determined whether the amplitude ratio is less than a low threshold value. If so, no estimation is performed in step 504. If not, then it is determined in step 506 whether the amplitude ratio is greater than a high threshold. If so, no altitude estimation is performed. If not, in step 508, the amplitude ratio is rounded to an index value. In step 510, an altitude estimation and confidence value are generated from a table, such as the table of FIG. 4A, from the range and index values.

In an exemplary embodiment, the target altitude is estimated at 100 foot intervals with a confidence factor ranging from 0 to 1. The confidence factor can be pre-calculated in the table based on the standard deviation of the altitude value at the given amplitude ratio before smoothing was applied, for example. It is understood that the granularity of the altitude estimate can vary to meet the needs of a particular application and the information obtainable from the radar system.

Figure 5A:
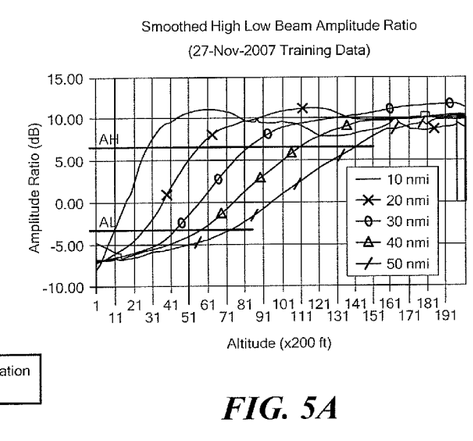
FIG. 5A is a graphical representation of smoothed high beam amplitude ratio data.

FIG. 5A shows an exemplary plot of amplitude ratio versus altitude at various ranges, shown as 10, 20, 30, 40, and 50 nautical miles (nmi) for exemplary data. It is understood that the plotted data is smoothed. The approximate threshold values, AH and AL, are also shown in FIG. 5A marking the linear portion of the smoothed data.

Figure 6:
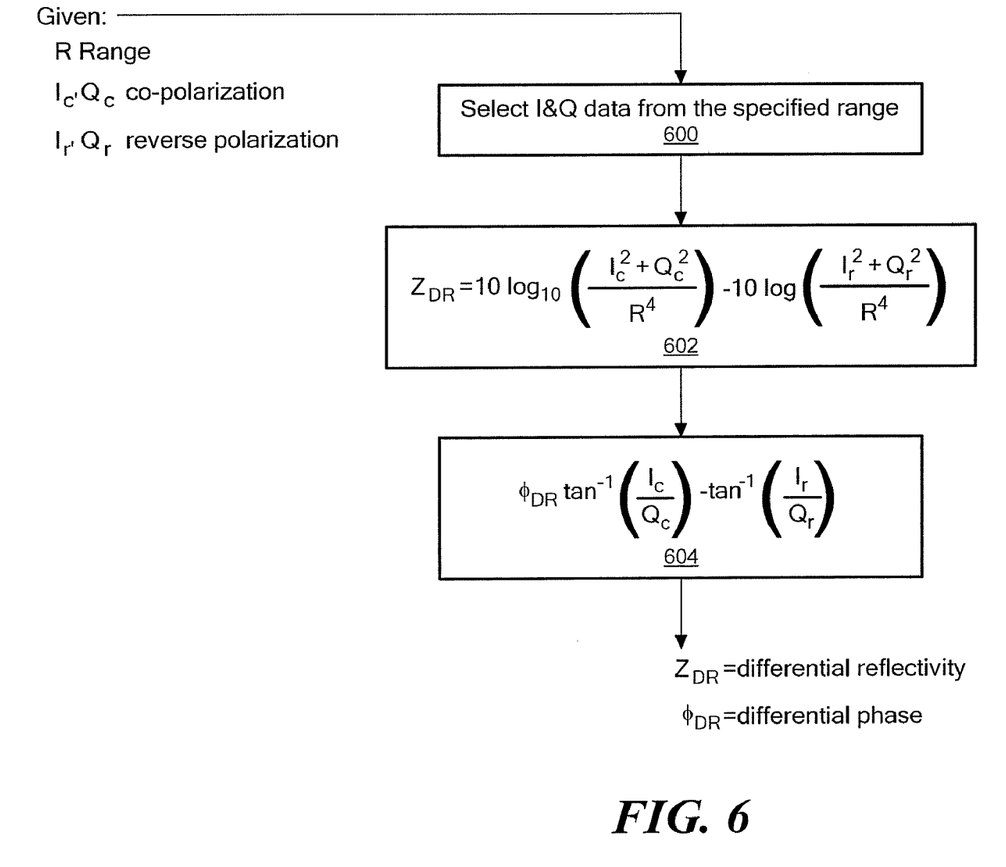
FIG. 6 is a flow diagram showing exemplary inphase and quadrature data processing.

FIG. 6 shows an exemplary sequence of steps for polarimetric parameter calculation in accordance with exemplary embodiments of the invention. For given range, Ic, Qc, co-polarization data, and Ir, Qr reverse polarization data, in step 600 I and Q data is selected from the specified range R. In step 602, the differential reflectivity $Z_{DR}$ is computed as $$Z_{DR} = 10 \log_{10}\left(\frac{I_C^2 + Q_C^2}{R^4}\right) - 10 \log_{10}\left(\frac{I_r^2 + Q_r^2}{R^4}\right).$$

In step 604, the differential phase $\phi_{DR}$ is computed as $$\phi_{DR} = \tan^{-1}\left(\frac{I_c}{Q_c}\right) - \tan^{-1}\left(\frac{I_r}{Q_r}\right).$$

Figure 7:
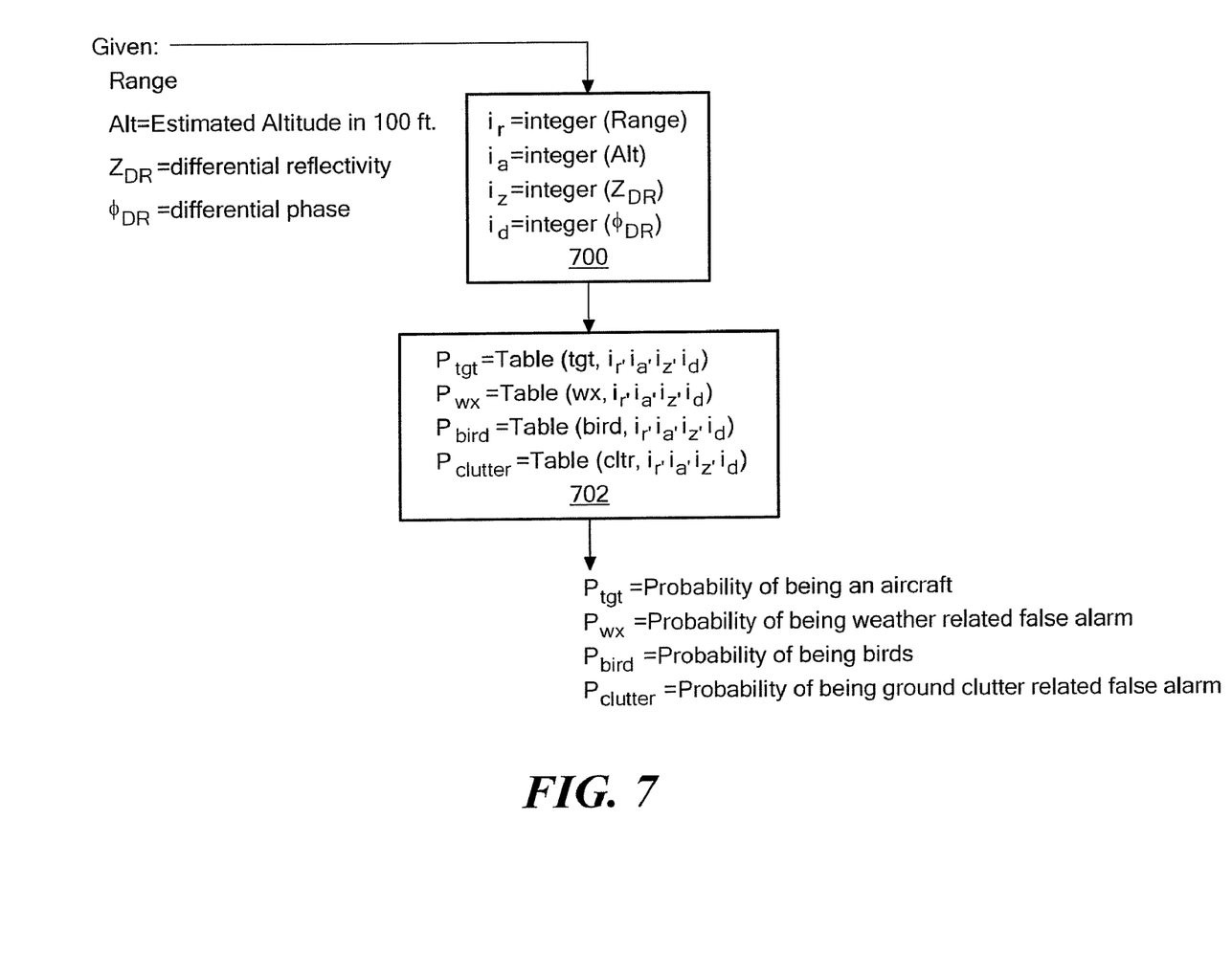
FIG. 7 is a flow diagram of exemplary probability processing.

FIG. 7 shows an exemplary sequence of steps for statistical target classification. In step 700, for given range R, estimated altitude Alt, differential reflectivity $Z_{DR}$, and differential phase $\phi_{DR}$, integer values $i_r$, $i_a$, $i_z$, and $i_d$, are generated in step 702 to generate probability values. More particularly, a probability of the target being an aircraft $P_{tgt}$ is computed from a table using values tgt, $i_r$, $i_a$, $i_z$, $i_d$. In an exemplary embodiment, the indexes tgt, wx, bird and cltr represent four separate tables that form the trained database filled with measured data from known objects such as aircraft (tgt), weather (wx), birds (bird) and ground clutter (cltr). Similarly, a probability of a target being a weather-related false alarm is determined from a table based on values for wx, $i_r$, $i_a$, $i_z$, $i_d$. The probability of a target being birds is determined from bird, $i_r$, $i_a$, $i_z$, $i_d$ and the probability of a target being ground clutter related false alarm is determined from cltr, $i_r$, $i_a$, $i_z$, $i_d$.

In another embodiment, the amplitude ratio $(Z_{DR})$ and phase difference $(\phi_{DR})$ between the target and weather channel data can be calculated to distinguish target characteristics. As noted above, a DASR system, such as the system 100 of FIG. 1, has a target and a weather channel. The weather channel is a different polarization to the target channel, and they are processed in separate receiver-signal processor channels.

The DASR weather channel determines precipitation reflectivity. In an exemplary embodiment, the weather channel data is processed in a similar manner to the target channel data. This approach provides simultaneous polarimetric data, which is an improvement over polarimetric data in alternative radar dwells. The amplitude ratio ($Z_{DR}$) and phase difference ($\phi_{DR}$) between the target and weather channel data can be calculated as follows:

$$Z_{DR} = 10 \cdot \log_{10}\left(\frac{I_c^2 + Q_c^2}{I_r^2 + Q_r^2}\right) \quad (1)$$

$$\phi_{DR} = \tan^{-1}\left(\frac{I_c}{Q_c}\right) - \tan^{-1}\left(\frac{I_r}{Q_r}\right) \quad (2)$$

where R is range, $I_c$ and $Q_c$ are the in-phase and quadrature data of the co-polarization channel, and $I_r$ and $Q_r$ are the in-phase and quadrature data of the reverse polarization channel.

It should be noted that while some systems, such as current ASR systems use a dual fan beam, they do not provide target altitude without associated beacon data. Since a DASR has both high and low beams, these beams can be processed simultaneously in a similar manner as in a mono-pulse radar to estimate target altitude. FIG. 3 described above shows an exemplary system having illustrative processing modules.

Figure 8:
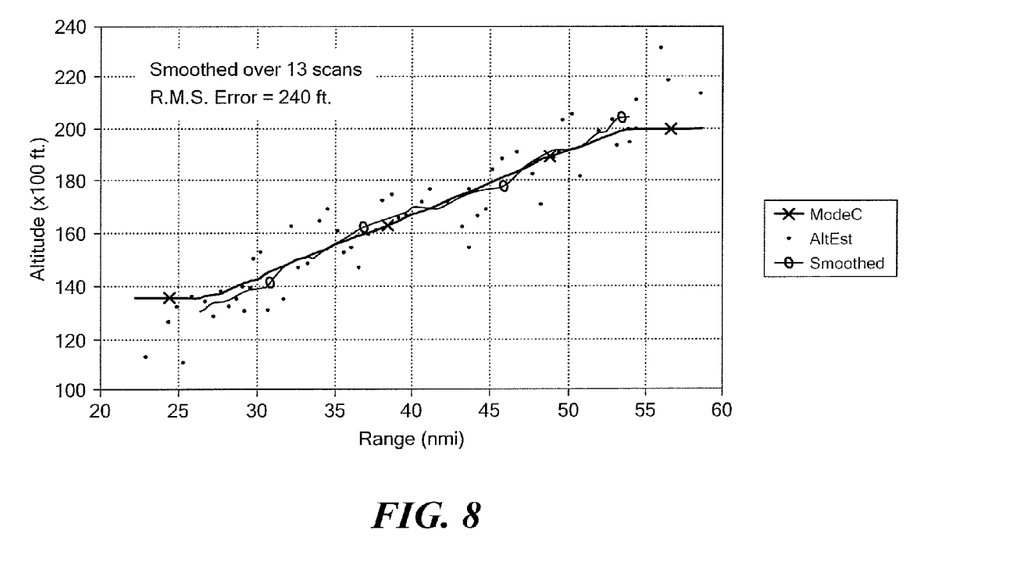
FIG. 8 is a graphical representation of altitude estimation versus range.

Actual data was recorded for simultaneous polarimetric data. FIG. 8 shows an example of estimated target altitude in comparison with the target altitude from the beacon radar. The altitude estimations (dots) have deviation from the beacon radar reported altitude (Mode C ode). Smoothing the altitude estimations over 13 scans, for example, provides a more accurate estimation of the target altitude. In this case the RMS error is 240 ft.

Figure 9:
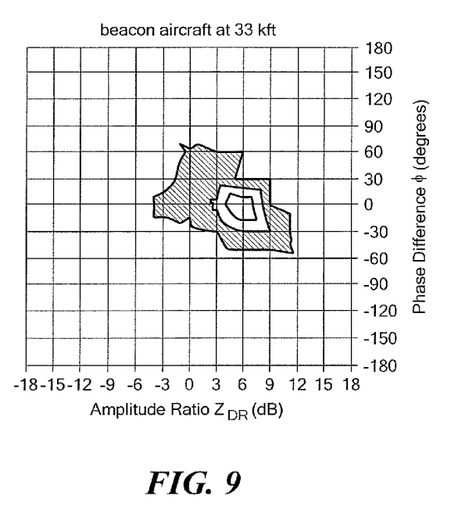
FIG. 9 is a mapping of amplitude ratio versus phase difference for an aircraft at 33 kft.
Figure 10:
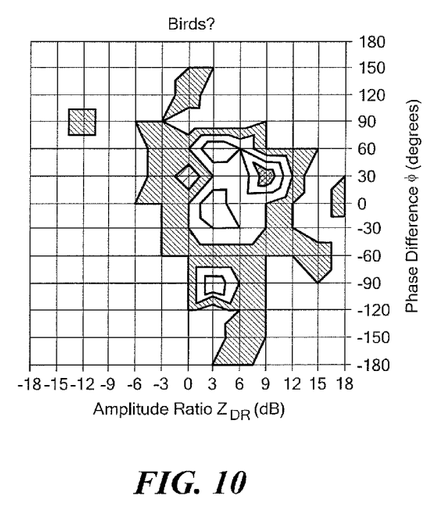
FIG. 10 is a mapping of amplitude ratio versus phase difference for a possible bird migration.

FIG. 9 shows the distinct features of an aircraft and FIG. 10 shows possible bird data expressed in amplitude ratio versus phase difference maps based upon collected data. FIG. 9 shows the peak of the distribution at 0 degree phase difference and 6 dB amplitude ratio. The bird data in FIG. 10 has a peak of the distribution at 30 degrees phase difference and 9 dB amplitude ratio. It should be noted that the distribution in FIG. 10 has wider spread than FIG. 9.

Exemplary embodiments of the invention use amplitude ratio, phase difference, estimated target altitude and target velocity, for target classification to distinguish aircraft from birds and precipitation. In illustrative embodiment, radar systems can include inventive target classification.

It is understood that a variety of polarizations can be used in various embodiments. Exemplary polarizations include linear polarization (transmission in vertical polarization, channel A received in elliptical polarization, channel B received in vertical polarization), circular polarization (transmission in circular polarization, channel A received in circular co-polarization, and channel B received in circular reverse polarization). As noted above, circular polarimetric data shows clear differences between channels and target types. It is understood that further polarization configurations are possible.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A system, comprising:
   an antenna;
   a target channel including:
     a low beam receiver channel;
     a high beam receiver channel; and
   a weather receiver channel; and
   a signal processor to receive data from the low beam channel, the high beam channel and the weather channel for performing an altitude estimation based upon a target amplitude ratio between the low beam channel and the high beam channel and target range, and for performing target classification by calculating polarimetric parameters from the target data and the weather data including differential reflectivity and differential phase data, wherein the target channel has a different polarization than the weather channel.

2. The system according to claim 1, wherein the altitude estimation is obtained and altitude accuracy is obtained by smoothing over multiple scans.

3. The system according to claim 1, wherein the differential reflectivity and the differential phase are obtained from co-polarization data and reverse polarization data.

4. The system according to claim 1, wherein the signal processor generates probability values for a target.

5. The system according to claim 4, wherein the probability values correspond to at least birds and aircraft.

6. The system according to claim 1, wherein the differential reflectivity is defined as:

$$Z_{DR} = 10 \cdot \log_{10}\left(\frac{I_c^2 + Q_c^2}{I_r^2 + Q_r^2}\right),$$

and the differential phase is defined as:

$$\phi_{DR} = \tan^{-1}\left(\frac{I_c}{Q_c}\right) - \tan^{-1}\left(\frac{I_r}{Q_r}\right),$$

where R is range, $I_c$ and $Q_c$ are the in-phase and quadrature data of the co-polarization channel, and $I_r$ and $Q_r$ are the in-phase and quadrature data of the reverse polarization channel.

7. The system according to claim 1, wherein the weather channel data and the target channel data are processed in the same radar dwell for simultaneous polarimetric data.

8. A method, comprising:
   receiving radar return at a target channel and a weather channel, wherein the target channel includes a low beam receiver channel and a high beam receiver channel;
   transforming the radar return in a signal processor and memory including processing data from the low beam channel, the high beam channel and the weather channel to generate altitude estimation data based upon a target amplitude ratio between the low beam channel and the high beam channel and target range; and
   transforming the radar return comprising performing target classification by calculating polarimetric parameters from the target data and the weather data including differential reflectivity and differential phase data, wherein the target channel has a different polarization than the weather channel.

9. The method according to claim 8, wherein the altitude estimation is obtained and improved altitude accuracy is obtained by smoothing over multiple scans.

10. The method according to claim 8, wherein the differential reflectivity and the differential phase are obtained from co-polarization data and reverse polarization data.

11. The method according to claim 8, further including generating probability values for a target.

12. The method according to claim 11, wherein the probability values correspond to at least birds and aircraft.

13. The method according to claim 8, wherein the differential reflectivity is defined as:

$$Z_{DR} = 10 \cdot \log_{10}\left(\frac{I_c^2 + Q_c^2}{I_r^2 + Q_r^2}\right),$$

and the differential phase is defined as:

$$\phi_{DR} = \tan^{-1}\left(\frac{I_c}{Q_c}\right) - \tan^{-1}\left(\frac{I_r}{Q_r}\right),$$

where R is range, $I_c$ and $Q_c$ are the in-phase and quadrature data of the co-polarization channel, and $I_r$ and $Q_r$ are the in-phase and quadrature data of the reverse polarization channel.

14. An article, comprising:
a computer readable medium comprising stored instructions that enable a machine to perform the steps of:
receiving radar return at a target channel and a weather channel, wherein the target channel includes a low beam receiver channel and a high beam receiver channel;
transforming the radar return in a signal processor and memory including processing data from the low beam channel, the high beam channel and the weather channel to generate altitude estimation data based upon a target amplitude ratio between the low beam channel and the high beam channel and target range; and
transforming the radar return comprising performing target classification by calculating polarimetric parameters from the target data and the weather data including differential reflectivity and differential phase data, wherein the target channel has a different polarization than the weather channel.

15. The article according to claim 14, wherein the altitude estimation is obtained and improved altitude accuracy is obtained by smoothing over multiple scans.

16. The article according to claim 14, wherein the differential reflectivity and the differential phase are obtained from co-polarization data and reverse polarization data.

17. The article according to claim 16, further including instructions for generating probability values for a target.

18. The article according to claim 17, wherein the probability values correspond to at least birds and aircraft.

19. The article according to claim 14, wherein the differential reflectivity is defined as:

$$Z_{DR} = 10 \cdot \log_{10}\left(\frac{I_c^2 + Q_c^2}{I_r^2 + Q_r^2}\right),$$

and the differential phase is defined as:

$$\phi_{DR} = \tan^{-1}\left(\frac{I_c}{Q_c}\right) - \tan^{-1}\left(\frac{I_r}{Q_r}\right),$$

where R is range, $I_c$ and $Q_c$ are the in-phase and quadrature data of the co-polarization channel, and $I_r$ and $Q_r$ are the in-phase and quadrature data of the reverse polarization channel.

* * * * *